United States Patent
Zhao et al.

(10) Patent No.: US 9,699,772 B2
(45) Date of Patent: Jul. 4, 2017

(54) METHOD, SYSTEM AND APPARATUS FOR INFORMATION TRANSMISSION

(71) Applicant: China Academy of Telecommunications Technology, Beijing (CN)

(72) Inventors: Rui Zhao, Beijing (CN); Xueming Pan, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 44 days.

(21) Appl. No.: 14/366,810

(22) PCT Filed: Sep. 21, 2012

(86) PCT No.: PCT/CN2012/081725
§ 371 (c)(1),
(2) Date: Jun. 19, 2014

(87) PCT Pub. No.: WO2013/091414
PCT Pub. Date: Jun. 27, 2013

(65) Prior Publication Data
US 2014/0348125 A1    Nov. 27, 2014

(30) Foreign Application Priority Data
Dec. 19, 2011    (CN) .......................... 2011 1 0427996

(51) Int. Cl.
*H04W 72/04*    (2009.01)
*H04W 72/02*    (2009.01)
(Continued)

(52) U.S. Cl.
CPC ............ *H04W 72/042* (2013.01); *H04B 7/06* (2013.01); *H04B 7/08* (2013.01); *H04L 5/0005* (2013.01);
(Continued)

(58) Field of Classification Search
None
See application file for complete search history.

(56) References Cited

U.S. PATENT DOCUMENTS

| 8,917,679 | B2 * | 12/2014 | Lindh | .................. H04L 5/0026 370/281 |
| 2009/0257449 | A1 * | 10/2009 | Chen | ..................... H04L 1/0041 370/470 |

(Continued)

FOREIGN PATENT DOCUMENTS

| CN | 102164416 A | 8/2011 |
| CN | 102395206 A | 3/2012 |

(Continued)

OTHER PUBLICATIONS

LG-Ericsson: Consideration on E-PDCCH multiplexing and signalling, 3GPP Draft; R1-113372, 3rd Generation Partnership Project (3GPP), Mobile Competence Centre ; 650, Route Des Lucioles , F-06921 Sophia-Antipolis Cedex ; France, vol. RAN WG1, no. Zhuhai; Oct. 10, 2011, Oct. 4, 2011 (Oct. 4, 2011), XP050538429, [retrieved on Oct. 4, 2011].

(Continued)

*Primary Examiner* — Chirag Shah
*Assistant Examiner* — Joshua Smith
(74) *Attorney, Agent, or Firm* — Kilpatrick Townsend & Stockton LLP

(57) ABSTRACT

Embodiments of this application relate to the field of wireless communications and particularly to a method of and system and apparatus for transmitting information so as to (Continued)

transmit DCI over E-PDCCHs. A method according to an embodiment of the invention includes: the network side selecting candidate E-PDCCHs for carrying DCI from a set of candidate E-PDCCHs, wherein the set of candidate E-PDCCHs includes E-PDCCHs occupying a plurality of time-frequency resources consecutive in frequency domain and E-PDCCHs occupying a plurality of time-frequency resources inconsecutive in frequency domain; and the network side transmitting the DCI over the selected candidate E-PDCCHs. With the method according to the embodiment of the invention, DCI can be transmitted over E-PDCCHs to thereby enable effectively the E-PDCCHs to occupy both the resources consecutive in frequency domain and the resources inconsecutive in frequency domain and improve the transmission efficiency and the system performance.

11 Claims, 12 Drawing Sheets

(51) Int. Cl.
　　*H04B 7/06*　　　　(2006.01)
　　*H04B 7/08*　　　　(2006.01)
　　*H04L 5/00*　　　　(2006.01)
　　*H04W 28/06*　　　(2009.01)

(52) U.S. Cl.
　　CPC .......... *H04L 5/0053* (2013.01); *H04W 72/02* (2013.01); *H04L 5/0048* (2013.01); *H04W 28/06* (2013.01)

(56) References Cited

U.S. PATENT DOCUMENTS

| | | | | |
|---|---|---|---|---|
| 2010/0165847 A1* | 7/2010 | Kamuf | ............... | H04L 5/0007 370/241 |
| 2010/0279628 A1* | 11/2010 | Love | ............... | H04L 5/0091 455/70 |
| 2010/0290418 A1* | 11/2010 | Nishio | ............... | H04J 13/004 370/329 |
| 2010/0317360 A1* | 12/2010 | McBeath | ............... | H04L 5/0091 455/450 |
| 2011/0044391 A1* | 2/2011 | Ji | ............... | H04L 5/0007 375/260 |
| 2011/0075624 A1* | 3/2011 | Papasakellariou | .... | H04L 5/0053 370/329 |
| 2011/0170496 A1* | 7/2011 | Fong | ............... | H04L 5/0053 370/329 |
| 2012/0320782 A1* | 12/2012 | Seo | ............... | H04L 1/1854 370/252 |
| 2013/0039188 A1* | 2/2013 | Larsson | ............... | H04L 5/0053 370/241 |
| 2013/0044692 A1* | 2/2013 | Nory | ............... | H04L 25/0228 370/329 |
| 2013/0064099 A1* | 3/2013 | Kim | ............... | H04L 5/0053 370/241 |
| 2013/0107861 A1* | 5/2013 | Cheng | ............... | H04W 72/042 370/331 |
| 2013/0114517 A1* | 5/2013 | Blankenship | ......... | H04L 5/0053 370/329 |
| 2013/0250906 A1* | 9/2013 | Golitschek Edler von Elbwart | ............ | H04W 72/0453 370/330 |

FOREIGN PATENT DOCUMENTS

CN　　　　102611524 A　　7/2012
WO　　　2011123975 A1　　10/2011

OTHER PUBLICATIONS

Renesas Mobile Europe Ltd: 'Link-level evaluation of E-PDCCH design aspects', 3GPP Draft; R1-113175, 3rd Generation Partnership Project (3GPP), Mobile Competence Centre ; 650, Route Des Lucioles , F-06921 Sophia-Antipolis Cedex ; France, vol. RAN WG1, no. Zhuhai; Oct. 10, 2011, Oct. 4, 2011 (Oct. 4, 2011), XP050538302, [retrieved on Oct. 4, 2011].
Extended European Search Report in the EP counterpart patent application.
International Search Report for PCT/CN2012/081725.
R1-113744: 3GPP TSG RAN WG1 Meeting #67, San Francisco, USA, Nov. 14-18, 2011.
R1-113744, 3GPP TSG RAN WG1 Meeting #67, San Francisco, USA, Nov. 14-18, 2011, Source: CATT, Title: E-PDCCH multiplexing and link level evaluations, Agenda Item: 7.7.4, Document for: Discussion and Decision.
An Office Action issued on Sep. 10, 2015 in the KR counterpart application (10-2014-7020344).
Apple Inc: "On the Structure and Usage Scenarios of ePDCCH", 3GPP Draft; R1-114300, 3rd Generation Partnership Project (3GPP), Mobile Competence Centre ; 650, Route Des Lucioles; F-06921 Sophia Antipolis Cedex; France, vol. RAN WG1, no. San Francisco, USA; Nov. 14, 2011-Nov. 18, 2011, Nov. 9, 2011 (Nov. 9, 2011), XP050562351, [retrieved on Nov. 9, 2011].
"3rd Generation Partnership Project; Technical Specification Group Radio Access Network; Evolved Universal Terrestrial Radio Access (EUTRA); Physical layer procedures (Release 10)", 3GPP Standard; 3GPP TS 36.213, $3^{rd}$ Generation Partnership Project (3GPP), Mobile Competence Centre ; 650, Route Des Lucioles ; F-06921 Sophia-Antipolis Cedex; France, vol. RAN WG1 , No. V10.4.0, Dec. 15, 2011 (Dec. 15, 2011), pp. 1-125, XP050555014, [retrieved on Dec. 15, 2011].

* cited by examiner

Fig.9

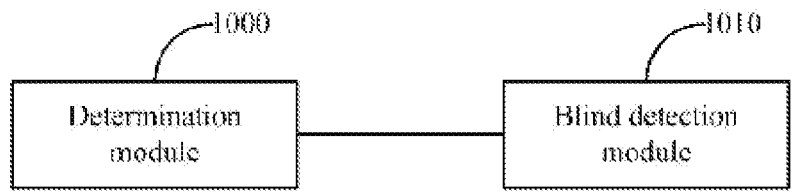

The network side selects candidate E-PDCCHs for carrying DCI from a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain

1102

The network side transmits the DCI over the selected candidate E-PDCCHs

A user equipment determines a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain

1202

The user equipment performs blinds detection on all the candidate E-PDCCHs in the set of candidate E-PDCCHs to receive DCI

Fig.12

METHOD, SYSTEM AND APPARATUS FOR INFORMATION TRANSMISSION

This application is a US National Stage of International Application No. PCT/CN2012/081725, filed on Sep. 21, 2012, designating the United States, and claiming the benefit of Chinese Patent Application No. 201110427996.0, filed with the Chinese Patent Office on Dec. 19, 2011 and entitled "Method of and apparatus and system for transmitting information", which is hereby incorporated by reference in its entirety.

FIELD OF THE INVENTION

The present invention relates to the field of wireless communications and particularly to a method of and apparatus and system for transmitting information.

BACKGROUND OF THE INVENTION

In a Long Term Evolution (LIE) system, Physical Downlink Control Channels (PDCCHs) are transmitted in each radio sub-frame and have a Time Division Multiplex (TDM) relationship with Physical Downlink Shared Channels (PDSCHs), as illustrated in FIG. 1A. The PDCCHs are transmitted in first N Orthogonal Frequency Division Multiplex (OFDM) symbols of a downlink sub-frame, where N may take the values 1, 2, 3 and 4, and N=4 is allowed to occur only in a system with a system bandwidth of 1.4 MHz.

In a Long Term Evolution-Advanced (LTE-A) system, the PDCCHs have been enhanced in order to further improve a demand for a capacity of PDCCH channels. For the enhanced PDCCHs, an existing solution is to transmit the enhanced PDCCHs in a PDSCH domain in the downlink sub-frame while reserving an original PDCCH domain. Existing transmission and reception schemes continue their use with the original PDCCH resources in the original PDCCH domain, for example, transmit diversity during transmission and blind detection of Downlink Control Information (DCI) in a public search space and a user equipment specific search space based upon a Cell-Specific Reference Signal (CRS) during reception; and the PDCCHs are transmitted in the first N OFDM symbols, where N may take the values 1, 2, 3 and 4, and N=4 is allowed to occur only in a system with a system bandwidth of 1.4 MHz, and this part of the PDCCH domain is referred to a legacy PDCCH domain. More advanced transmission and reception schemes can be used with a part of the original PDSCH resources in the enhanced PDCCH domain, for example, pre-coding during transmission and detection based upon a UE-Specific Reference Signal (UE-RS), i.e. a Demodulation Reference Symbol (DMRS), during reception; and the PDCCHs are transmitted over time-frequency resources beyond the legacy PDCCH domain, and this part of the PDCCH domain is referred to as an enhanced PDCCH (E-PDCCH) domain, as illustrated in FIG. 1B.

As currently specified, the E-PDCCHs can occupy resources consecutive in frequency domain, as illustrated in FIG. 1C; or can occupy resources inconsecutive in the frequency domain, as illustrated in FIG. 1D. However there has been no particular solution to transmission of DCI over the E-PDCCHs.

In summary there has been no particular solution to transmission of DCI over the E-PDCCHs so far.

SUMMARY OF THE INVENTION

Embodiments of the invention provide a method of and system and apparatus for transmitting information so as to transmit DCI over E-PDCCHs.

An embodiment of the invention provides a method of transmitting information, the method including:
the network side selecting candidate E-PDCCHs for carrying DCI from a set of candidate E-PDCCHs, wherein the set of candidate E-PDCCHs includes E-PDCCHs occupying a plurality of time-frequency resources consecutive in frequency domain and E-PDCCHs occupying a plurality of time-frequency resources inconsecutive in frequency domain; and
the network side transmitting the DCI over the selected candidate E-PDCCHs.

An embodiment of the invention provides another method of transmitting information, the method including:
a user equipment determining a set of candidate E-PDCCHs, wherein the set of candidate E-PDCCHs includes E-PDCCHs occupying a plurality of time-frequency resources consecutive in frequency domain and E-PDCCHs occupying a plurality of time-frequency resources inconsecutive in frequency domain; and
the user equipment performing blind detection on all the candidate E-PDCCHs in the set of candidate E-PDCCHs to receive DCI.

An embodiment of the invention provides a network-side apparatus for transmitting information, the apparatus including:
a selection module configured to select candidate E-PDCCHs for carrying DCI from a set of candidate E-PDCCHs, wherein the set of candidate E-PDCCHs includes E-PDCCHs occupying a plurality of time-frequency resources consecutive in frequency domain and E-PDCCHs occupying a plurality of time-frequency resources inconsecutive in frequency domain; and
a transmission module configured to transmit the DCI over the selected candidate E-PDCCHs.

An embodiment of the invention provides a user equipment for transmitting information, the user equipment including:
a determination module configured to determine a set of candidate E-PDCCHs, Wherein the set of candidate E-PDCCHs includes E-PDCCHs occupying a plurality of time-frequency resources consecutive in frequency domain and E-PDCCHs occupying a plurality of time-frequency resources inconsecutive in frequency domain; and
a blind detection module configured to perform blind detection on all the candidate E-PDCCHs in the set of candidate E-PDCCHs to receive DCI.

An embodiment of the invention provides a system for transmitting information, the system including:
a network-side apparatus configured to select candidate E-PDCCHs for carrying DCI from a set of candidate E-PDCCHs; and
a user equipment configured to determine the set of candidate E-PDCCHs and to perform blind detection on all the candidate E-PDCCHs in the set of candidate E-PDCCHs to receive the DCI,
wherein the set of candidate E-PDCCHs includes E-PDCCHs occupying a plurality of time-frequency resources consecutive in frequency domain and E-PDCCHs occupying a plurality of time-frequency resources inconsecutive in frequency domain, and the DCI is transmitted over the selected E-PDCCHs.

Since the network side selects the candidate E-PDCCHs for carrying the DCI from the set of candidate E-PDCCHs, and the user equipment performs blind detection on all the candidate E-PDCCHs in the set of candidate E-PDCCHs, thus DCI can be transmitted over the E-PDCCHs to thereby enable effectively the E-PDCCHs to occupy both the resources consecutive in frequency domain and the resources inconsecutive in frequency domain and improve the transmission efficiency and the system performance.

BRIEF DESCRIPTION OF THE DRAWINGS

FIG. 9 is a schematic structural diagram of a network-side apparatus according to an embodiment of the invention;

FIG. 10 is a schematic structural diagram of a user equipment according to an embodiment of the invention;

FIG. 11 is a schematic flow chart of a method of transmitting information at the network side according to an embodiment of the invention; and FIG. 12 is a schematic flow chart of a method of transmitting information at the user equipment side according to an embodiment of the invention.

DETAILED DESCRIPTION OF THE EMBODIMENTS

In embodiments of the invention, the network side selects candidate E-PDCCHs for carrying DCI from a set of candidate E-PDCCHs, and a user equipment performs blind detection on all the candidate E-PDCCHs in the set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain. Since the network side selects the candidate E-PDCCHs for carrying the DCI from the set of candidate E-PDCCHs, and the user equipment performs blind detection on all the candidate E-PDCCHs in the set of candidate E-PDCCHs, thus DCI can be transmitted over the E-PDCCHs to thereby enable effectively the E-PDCCHs to occupy both the resources consecutive in frequency domain and the resources inconsecutive in frequency domain and improve the transmission efficiency and the system performance.

Particularly in the embodiments of the invention, a candidate E-PDCCH is defined as an E-PDCCH resource element on which the user equipment needs to perform DCI format detection;

A resource occupied by a candidate E-PDCCH is defined as a time-frequency resource over which an E-PDCCH can be transmitted;

The user equipment detects transmitted downlink control information over each candidate E-PDCCH over the time-frequency resources over which the E-PDCCHs are transmitted through blind detection; and The set of candidate E-PDCCHs includes E-PDCCHs occupying a plurality of time-frequency resources consecutive in frequency domain and E-PDCCHs occupying a plurality of time-frequency resources inconsecutive in frequency domain.

Particularly in the embodiments of the invention, the plurality of consecutive time-frequency resources occupy at least one E-PDCCH cluster; and the plurality of consecutive time-frequency resources occupy a plurality of E-PDCCH clusters.

Figure 1A:
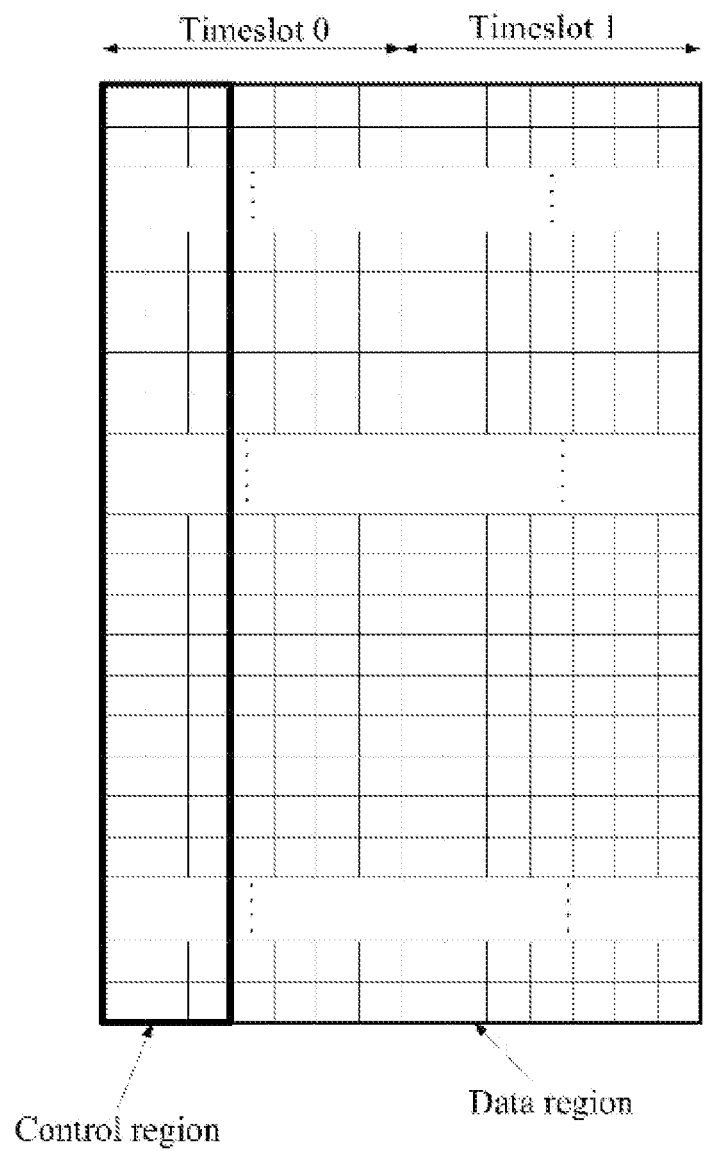
FIG. 1A is a schematic diagram of a multiplex relationship between a control region and a data region in a downlink sub-frame in the prior art.
Figure 1B:
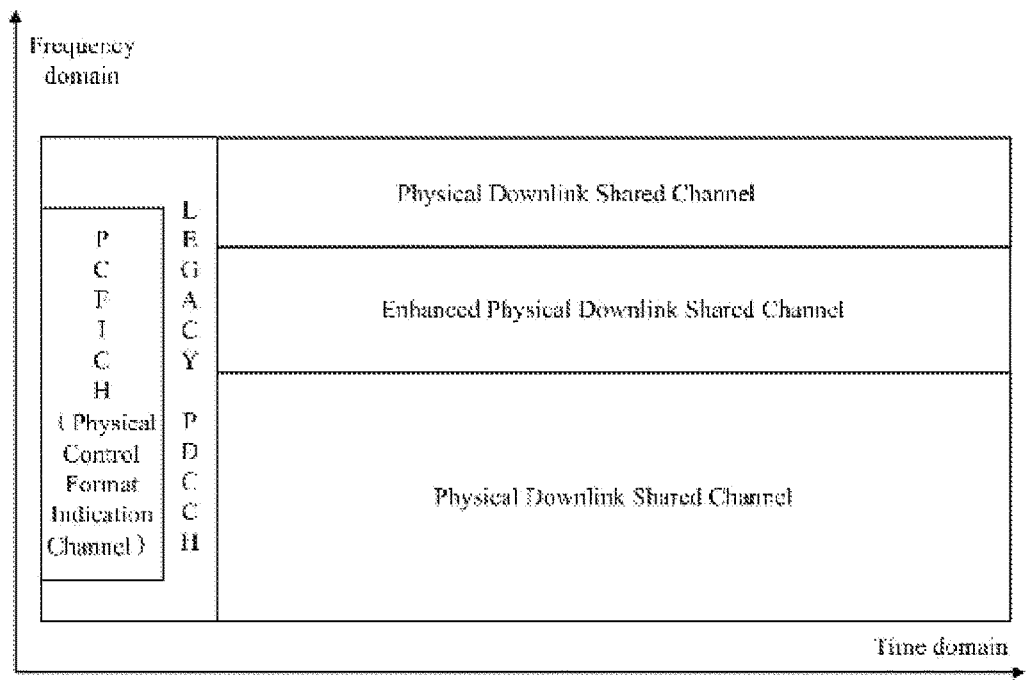
FIG. 1B is a schematic structural diagram of an enhanced PDCCH in the prior art.
Figure 1C:
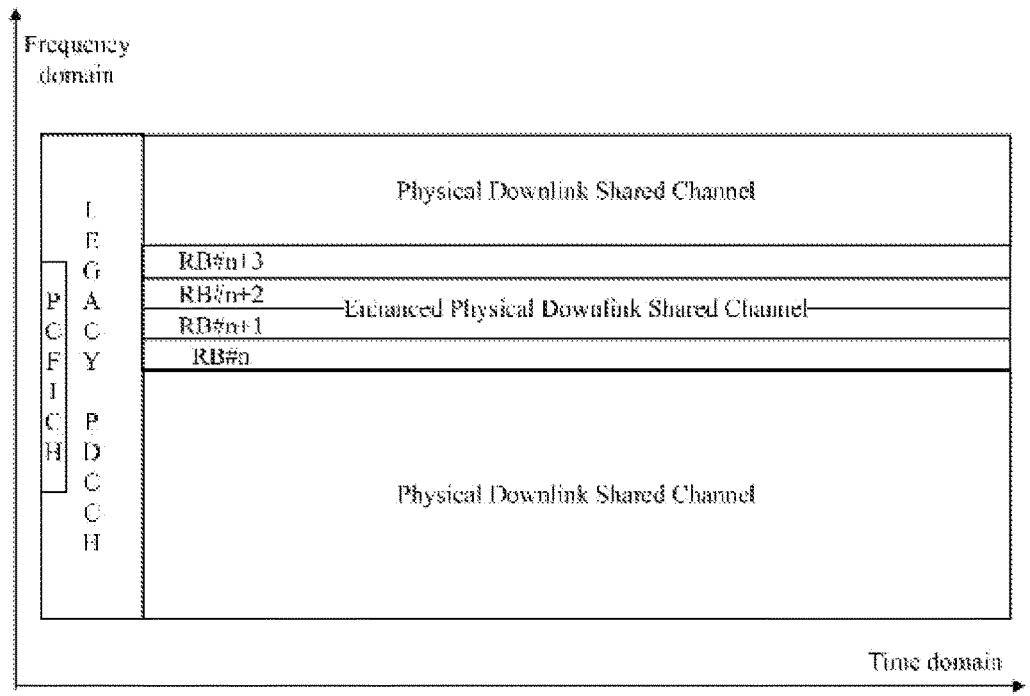
FIG. 1C is a schematic diagram of resources consecutive in frequency domain in the prior art.
Figure 1D:
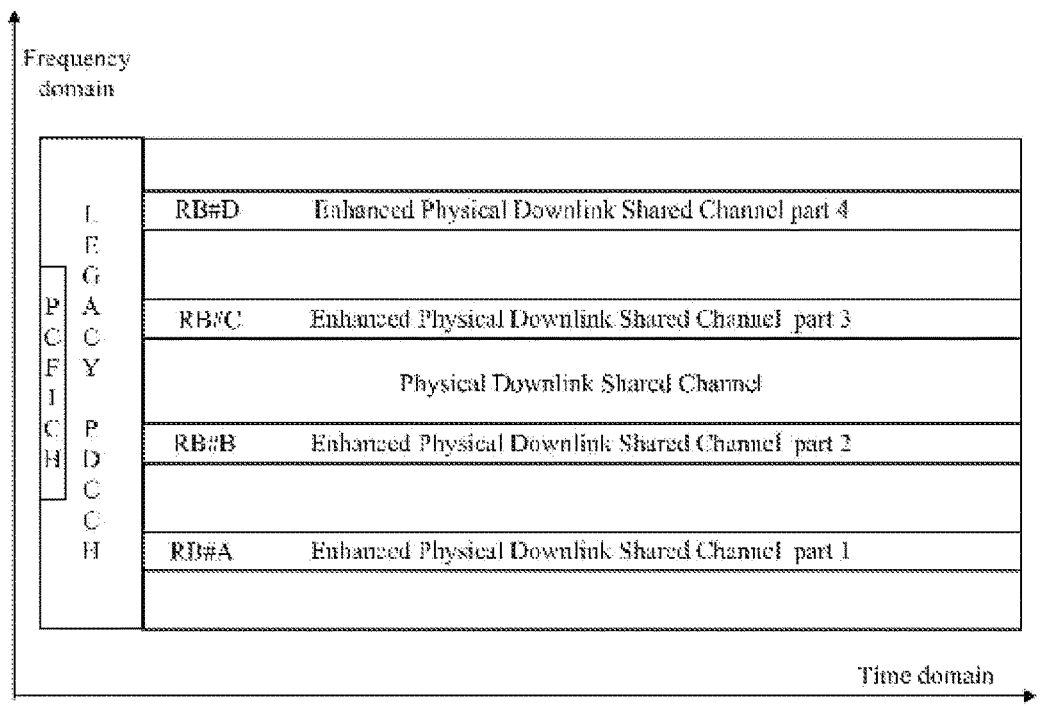
FIG. 1D is a schematic diagram of resources inconsecutive in frequency domain on the prior art.
Figure 2:
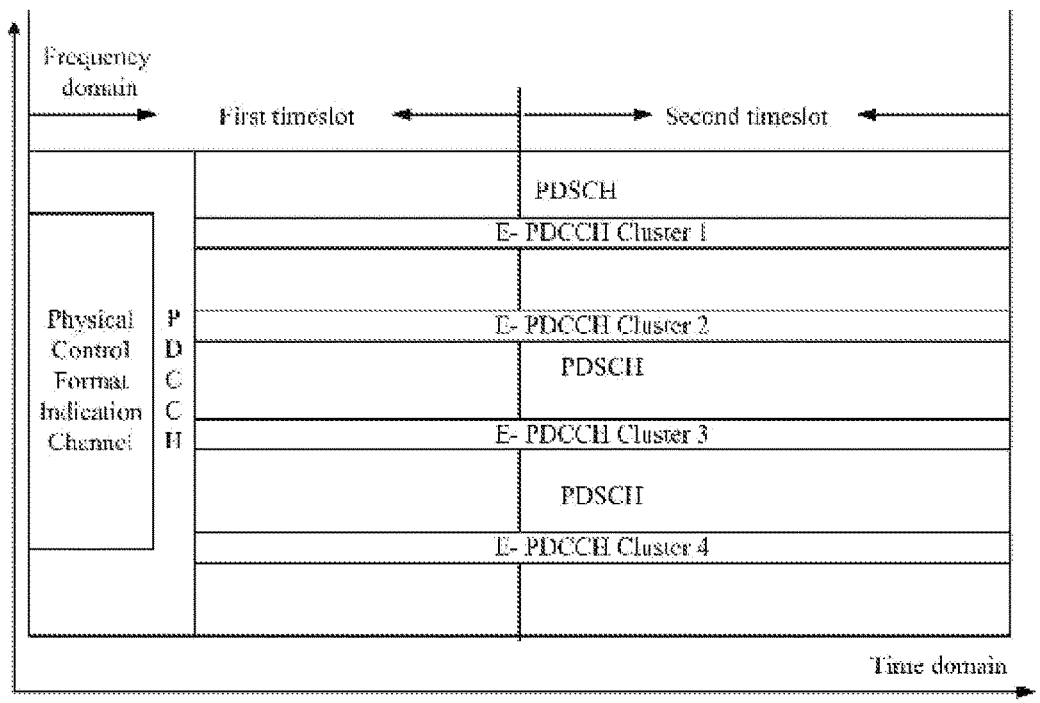
FIG. 2 is a schematic diagram of E-PDCCH clusters according to an embodiment of the invention.

Preferably in the embodiments of the invention, the number of E-PDCCH clusters can be four, particularly as illustrated in FIG. 2. An E-PDCCH cluster is a set of time-frequency resources consecutive in frequency domain at a granularity which can be a Physical Resource Block (PRB) pair.

Taking FIG. 2 as an example, in the embodiments of the invention, the E-PDCCH cluster occupied by the plurality of consecutive time-frequency resources is at least one E-PDCCH cluster in FIG. 2; and In the embodiments of the invention, the E-PDCCH clusters occupied by the plurality of inconsecutive time-frequency resources are a plurality of E-PDCCH clusters in FIG. 2.

The embodiments of the invention will be further described below in details with reference to the drawings of the invention.

In the following description, firstly an implementation with cooperation of the network side and the user equipment side will be described, and finally implementations at the network side and at the user equipment side will be described respectively, but this will not suggest required cooperation of both the sides for an implementation, and in fact, problems present respectively at the network side and at the user equipment side will also be addressed in the separate implementations at the network side and at the user equipment side, although a better technical effect can be achieved in the implementation with cooperation of both the sides.

Figure 3:
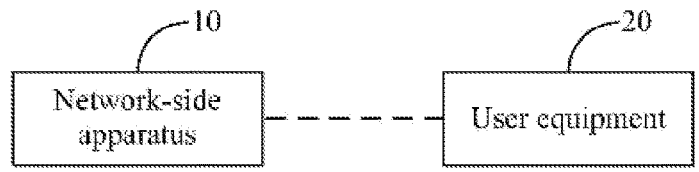
FIG. 3 is a schematic structural diagram of a system for transmitting information according to an embodiment of the invention.

As illustrated in FIG. 3, a system for transmitting information according to an embodiment of the invention includes a network-side apparatus 10 and a user equipment 20.

The network-side apparatus 10 is configured to select candidate E-PDCCHs for carrying DCI from a set of candidate E-PDCCHs; and The user equipment 20 is configured to determine the set of candidate E-PDCCHs and to perform blind detection on all the candidate E-PDCCHs in the set of candidate E-PDCCHs to receive the DCI, Where the set of candidate E-PDCCHs includes E-PDCCHs occupying a plurality of time-frequency resources consecutive in frequency domain and E-PDCCHs occupying a plurality of time-frequency resources inconsecutive in frequency domain, and the DCI is transmitted over the selected E-PDCCHs.

Preferably the network-side apparatus 10 selects the candidate E-PDCCHs for carrying the DCI from the set of candidate E-PDCCHs according to an aggregation level of the DCI to be transmitted; and Correspondingly the user equipment 20 performs blind detection on all the candidate E-PDCCHs in the set of candidate E-PDCCHs according to different aggregation levels.

The DCI is transmitted at different aggregation levels according to desirable encoding rates, and here a time-frequency resource at an aggregation level is referred to as an Enhanced-Control Channel Element (E-CCE). For example, N={1, 2, 4, 8}, where N here is referred to as an aggregation level. An E-CCE here can be a PRB pair or can be an Enhanced-Resource Element Group (E-REG) or consisted of a plurality of E-REGs. An E-REG is composed of N consecutive available REs in a specific set of physical resources other than a Legacy PDCCH and reference signals (a CRS, ad MRS and a CSI-RS (channel state information measurement reference signals) or the like) and can be defined in numerous ways, and FIG. 4A to FIG. 4D illustrates several possible E-REGs.

Figure 4A:
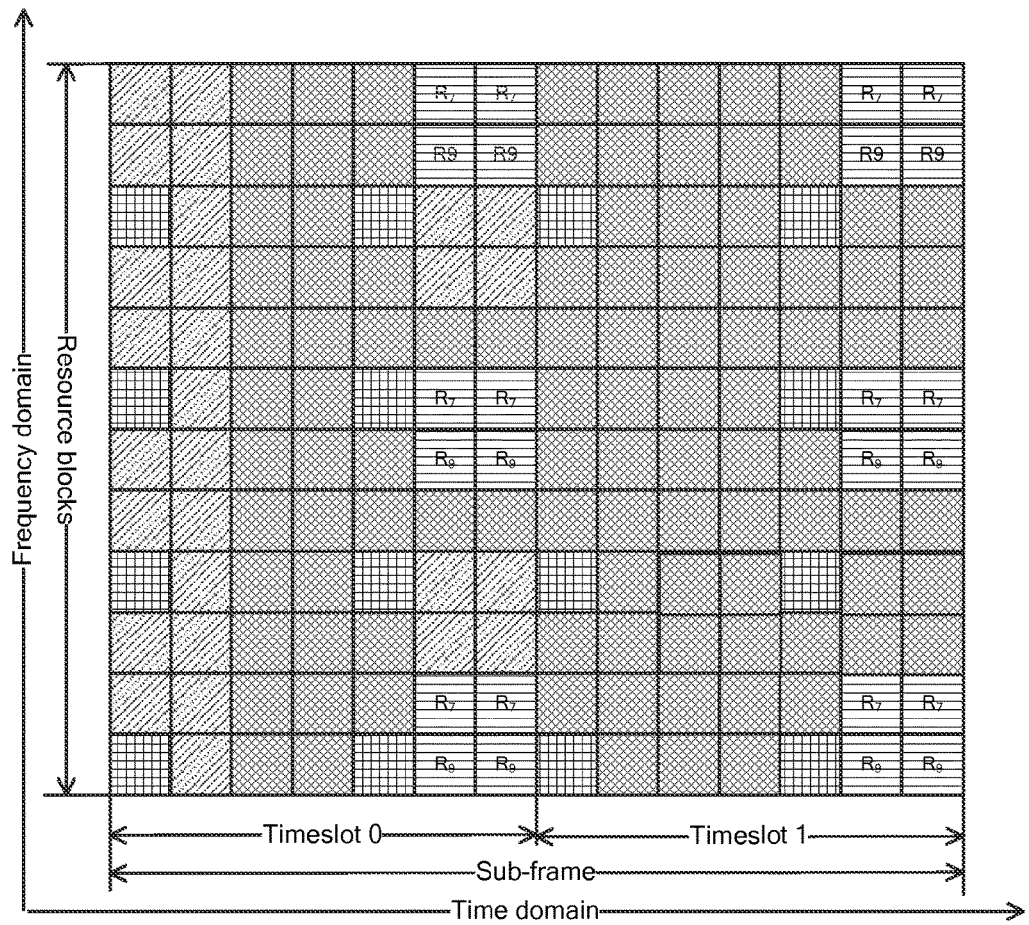
FIG. 4A is a schematic diagram of a first E-REG according to an embodiment of the invention.
Figure 4A:
Figure 4B:
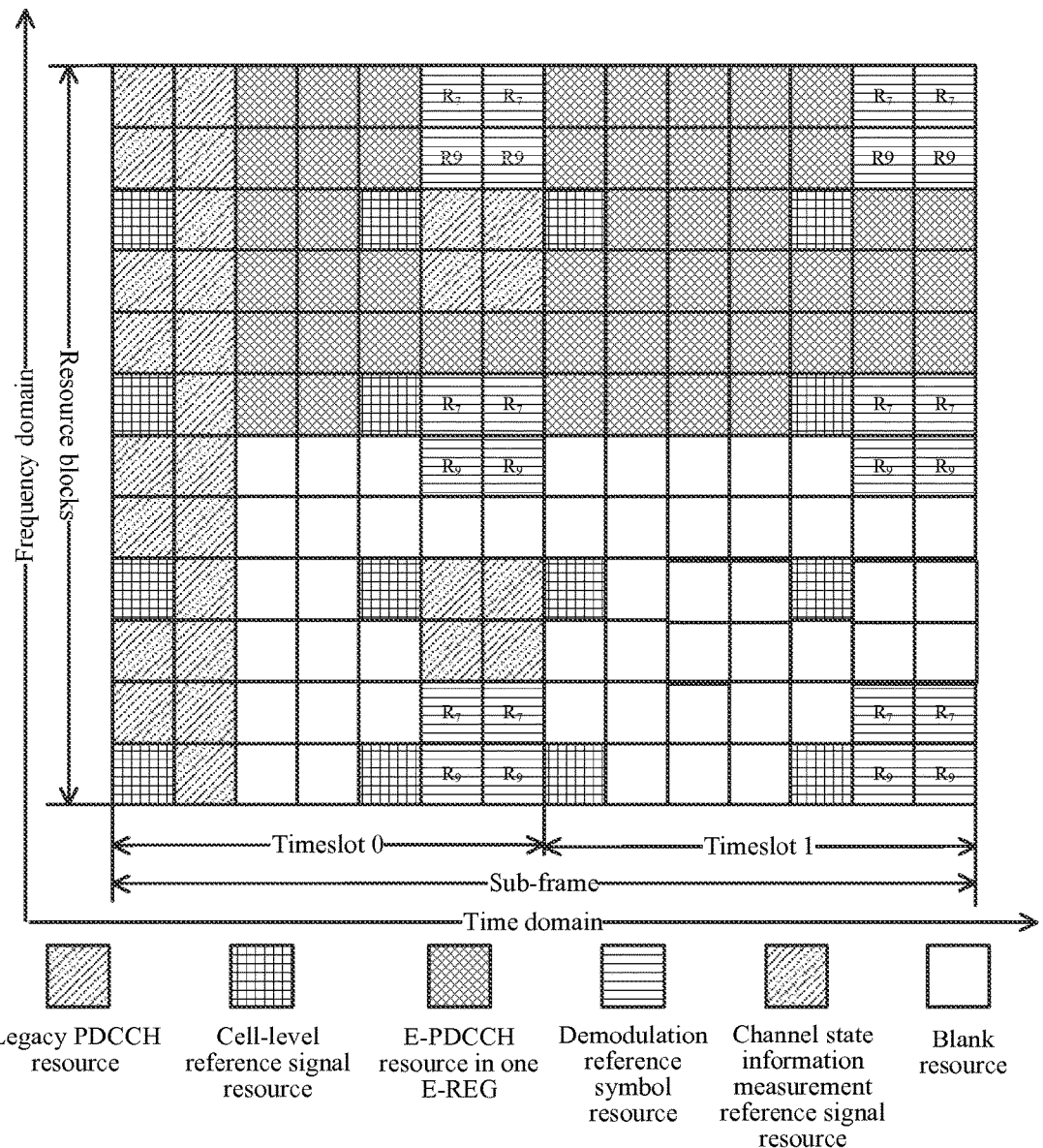
FIG. 4B is a schematic diagram of a second E-REG according to an embodiment of the invention.
Figure 4C:
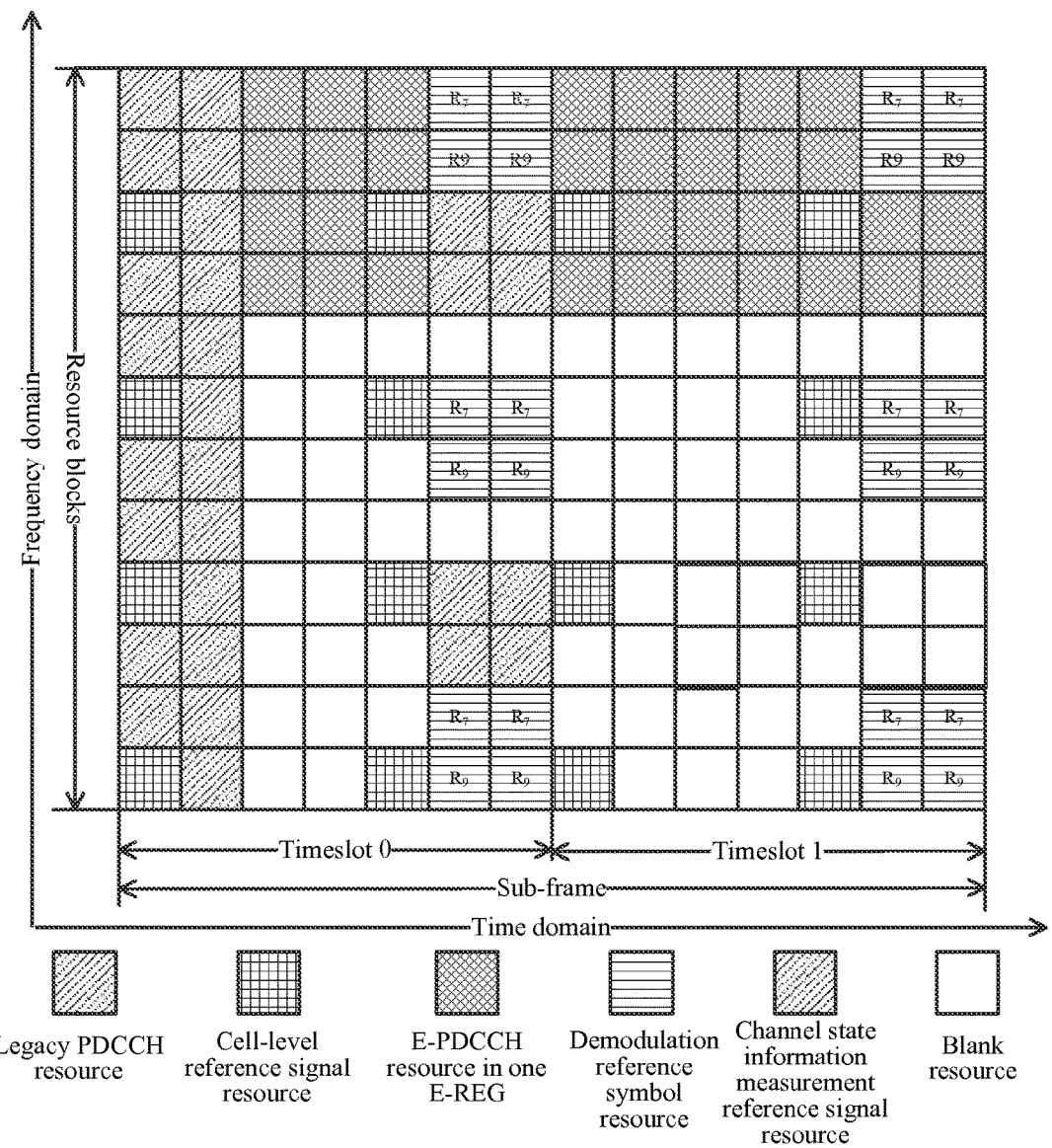
FIG. 4C is a schematic diagram of a third E-REG according to an embodiment of the invention.

In addition to the upper half of the REs occupied as illustrated in FIG. 4A to FIG. 4D, the REs can also be particularly occupied otherwise, and as illustrated in FIG. 4B, for example, if there are two E-REGs, then one of the E-REG is represented by the upper half of the REs, and the other E-REG is represented by the lower half of the REs.

In different carrier configurations, there may be a different number of available REs even in the case of the same size of E-CCE resource. Table 1 below depicts the number of available REs calculated in the case that the size of E-CCE resource is three sub-carriers and six sub-carriers under the condition assumed that the overhead of (the overhead of a resource occupied by) a CSI-RS is 8 RE/PRB pairs, the overhead of a DMRS is 24 RE/PRB pairs, and the overhead of a CRS is 16 RE/PRB pairs.

TABLE 1

The numbers of REs occupied for different sizes of E-CCE resource

| The number of OFDM symbols occupied by a Legacy PDCCH | The number of REs when the size of E-PDCCH resource is three sub-carriers (FIG. 4D) | The number of REs when the size of E-PDCCH resource is six sub-carriers (FIG. 4B) |
| --- | --- | --- |
| Case 1: 0 OFDM symbol (without a CRS) | 32 | 68 |
| Case 2: 1 OFDM symbol with CRS) | 26 | 56 |
| Case 3: 2 OFDM symbol (with a CRS) | 23 | 50 |
| Case 4: 3 OFDM symbol (with a CRS) | 20 | 44 |

As can be apparent from Table 1 above, there are a significantly different number of available REs in the case of the same size of E-CCE resource in a different carrier configuration (for example, the size of E-CCE resource is three sub-carriers in the case 1 and the case 4).

In an implementation, the time-frequency resources occupied at the aggregation level are configured fixedly or configured flexibly.

Figure 4D:
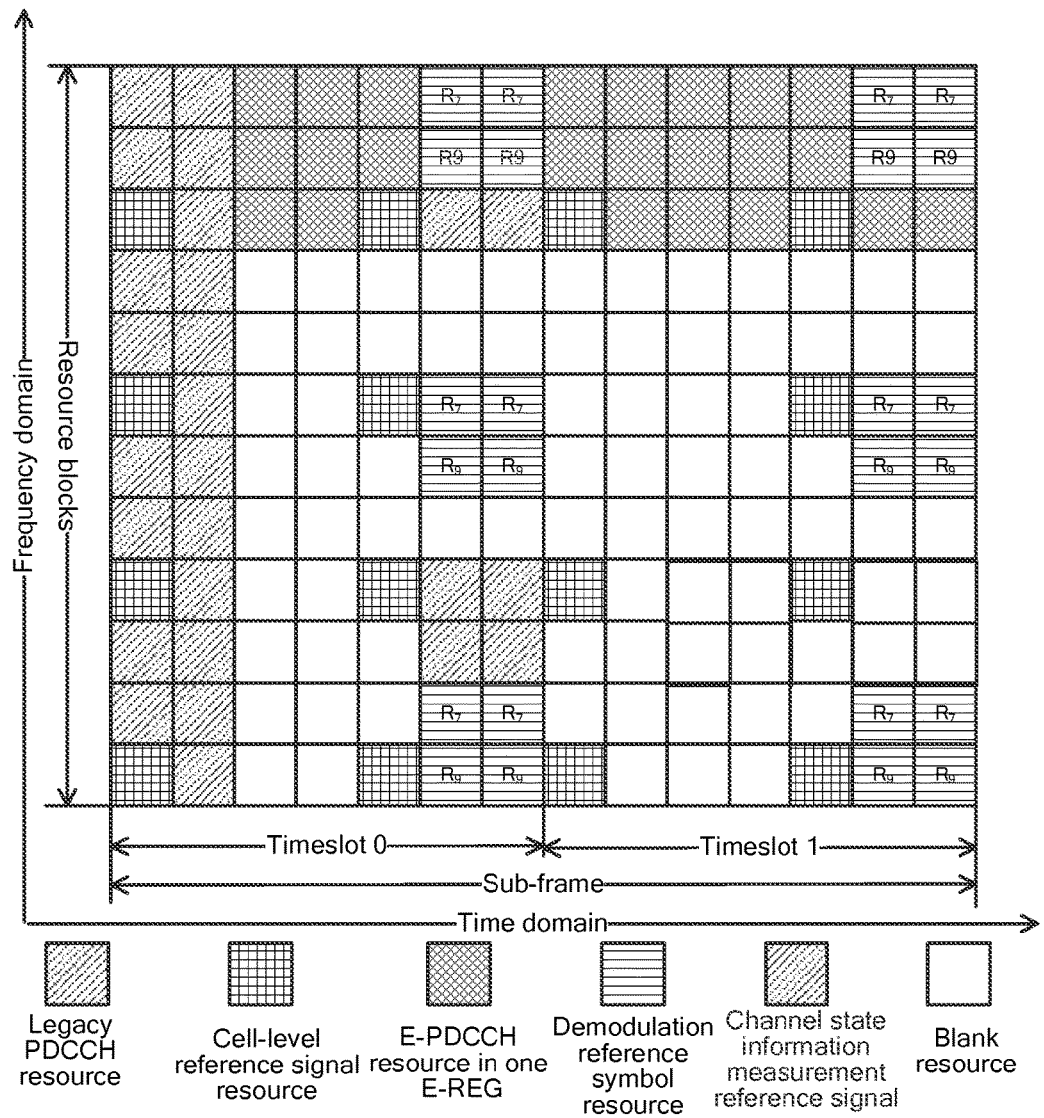
FIG. 4D is a schematic diagram of a fourth E-REG according to an embodiment of the invention.

If they are configured fixedly, then six fixed sub-carriers in a PRB block (as illustrated in FIG. 4B) and three sub-carriers in a PRB block (as illustrated in FIG. 4DB) can be specified in a protocol.

If they are configured flexibly, then the network-side apparatus 10 and the user equipment 20 determines the size of the time-frequency resources occupied at the aggregation level according to a resource configuration or a carrier configuration or higher-layer instruction information.

Specifically.

1. The size of the time-frequency resources occupied at the aggregation level is determined according to a resource configuration, for example, both a carrier configuration and a resource configuration (a CRS, a CSI RS, a MRS, etc.) are involved in the case 1 to the case 4 in Table 1.

2. The size of the time-frequency resources occupied at the aggregation level is determined according to a carrier configuration, for example, the size of E-CCE can be three sub-carriers in a PRB pair (as illustrated in FIG. 4B) in the case 1 in Table 1, and the size of E-CCE can be six sub-carriers in a PRB pair (as illustrated in FIG. 4D) in the case 4.

3. The size of the time-frequency resources occupied at the aggregation level is determined according to higher-layer instruction information.

In an implementation, for different aggregation levels, the network-side apparatus 10 can select only the E-PDCCHs occupying the plurality of time-frequency resources consecutive in frequency domain as the candidate E-PDCCHs for carrying the DCI; or can select only the E-PDCCHs occupying the plurality of time-frequency resources inconsecutive in frequency domain as the candidate E-PDCCHs for carrying the DCI; or can select the E-PDCCHs occupying the plurality of time-frequency resources consecutive in frequency domain and the E-PDCCHs occupying the plurality of time-frequency resources inconsecutive in frequency domain as the candidate E-PDCCHs for carrying the DCI.

Several scenarios will be listed below.

In a first scenario, if the aggregation level of the DCI to be transmitted is 1 or 2, then the network-side apparatus 10 can select the E-PDCCHs occupying the plurality of time-frequency resources consecutive in frequency domain from the set of candidate E-PDCCHs as the candidate E-PDCCHs for carrying the DCI; and If the aggregation level of the DCI to be transmitted is 4 or 8, then the network-side apparatus 10 can select the E-PDCCHs occupying the plurality of time-frequency resources inconsecutive in frequency domain from the set of candidate E-PDCCHs as the candidate E-PDCCHs for carrying the DCI.

Correspondingly the user equipment 20 needs to perform blind detection for all the aggregation levels because it has no knowledge of the aggregation level of the DCI to be transmitted.

For the aggregation level 1 or 2, the user equipment 20 performs blind detection on the candidate E-PDCCHs occupying a plurality of time-frequency resources consecutive in frequency domain; and For the aggregation level 4 or the user equipment 20 performs blind detection on the candidate E-PDCCHs occupying a plurality of time-frequency resources inconsecutive in frequency domain.

In an implementation, the user equipment has at least two candidate E-PDCCHs at each aggregation level and receives concurrently a DL grant for scheduling a PDSCH and a UL grant for scheduling a PUSCH.

Figure 5:
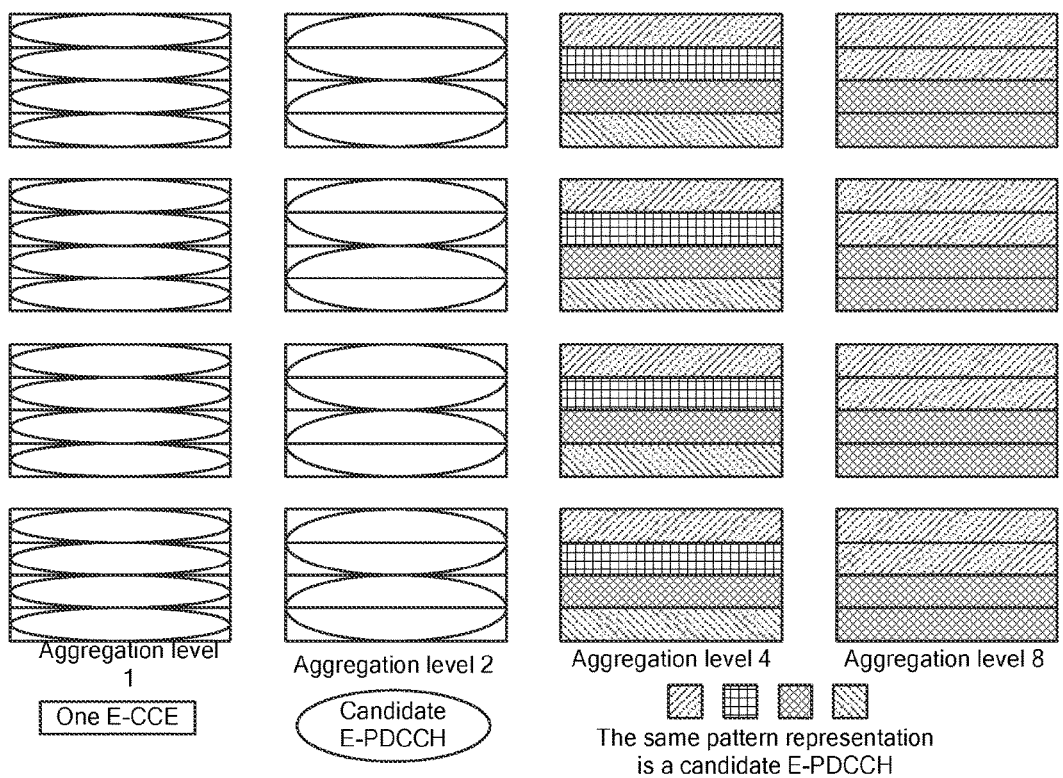
FIG. 5 is a schematic diagram of a first E-PDCCH search space configuration according to an embodiment of the invention.

Taking FIG. 5 as an example, an E-PDCCH cluster is composed of four E-CCEs.

For the Aggregation Level 1:

The network-side apparatus 10 selects the E-PDCCHs occupying the plurality of time-frequency resources consecutive in frequency domain from the set of candidate E-PDCCHs as the candidate E-PDCCHs for carrying the DCI, where the number of candidate E-PDCCHs in the set of candidate E-PDCCHs is 16; and The user equipment 20 performs blind detection only on the E-PDCCHs occupying the plurality of time-frequency resources consecutive in frequency domain, where the number of candidate E-PDCCHs on which the user equipment performs blind detection is 16.

For the Aggregation Level 2:

The network-side apparatus 10 selects the E-PDCCHs occupying the plurality of time-frequency resources consecutive for frequency domain from the set of candidate E-PDCCHs as the candidate E-PDCCHs for carrying the DCI, where the number of candidate E-PDCCHs in the set of candidate E-PDCCHs is 8; and The user equipment 20 performs blind detection only on the E-PDCCHs occupying the plurality of time-frequency resources consecutive in frequency domain, where the number of candidate E-PDCCHs on which the user equipment performs blind detection is 8.

For the Aggregation Level 3:

The network-side apparatus 10 selects the E-PDCCHs occupying the plurality of time-frequency resources inconsecutive in frequency domain from the set of candidate E-PDCCH as the candidate E-PDCCHs for carrying the DCI, where the number of candidate E-PDCCHs in the set of candidate E-PDCCHs is 4; and The user equipment 20 performs blind detection only on the E-PDCCHs occupying the plurality of time-frequency resources inconsecutive in frequency domain, where the number of candidate E-PDCCHs on which the user equipment performs blind detection is 4.

For the Aggregation Level 4:

The network-side apparatus 10 selects the E-PDCCHs occupying the plurality of time-frequency resources inconsecutive in frequency domain from the set of candidate E-PDCCHs as the candidate E-PDCCHs for carrying the DCI, where the number of candidate E-PDCCHs in the set of candidate E-PDCCHs is 2; and The user equipment 20 performs blind detection only on the E-PDCCHs occupying the plurality of time-frequency resources inconsecutive in frequency domain, where the number of candidate E-PDCCHs on which the user equipment performs blind detection is 2.

Figure 6:
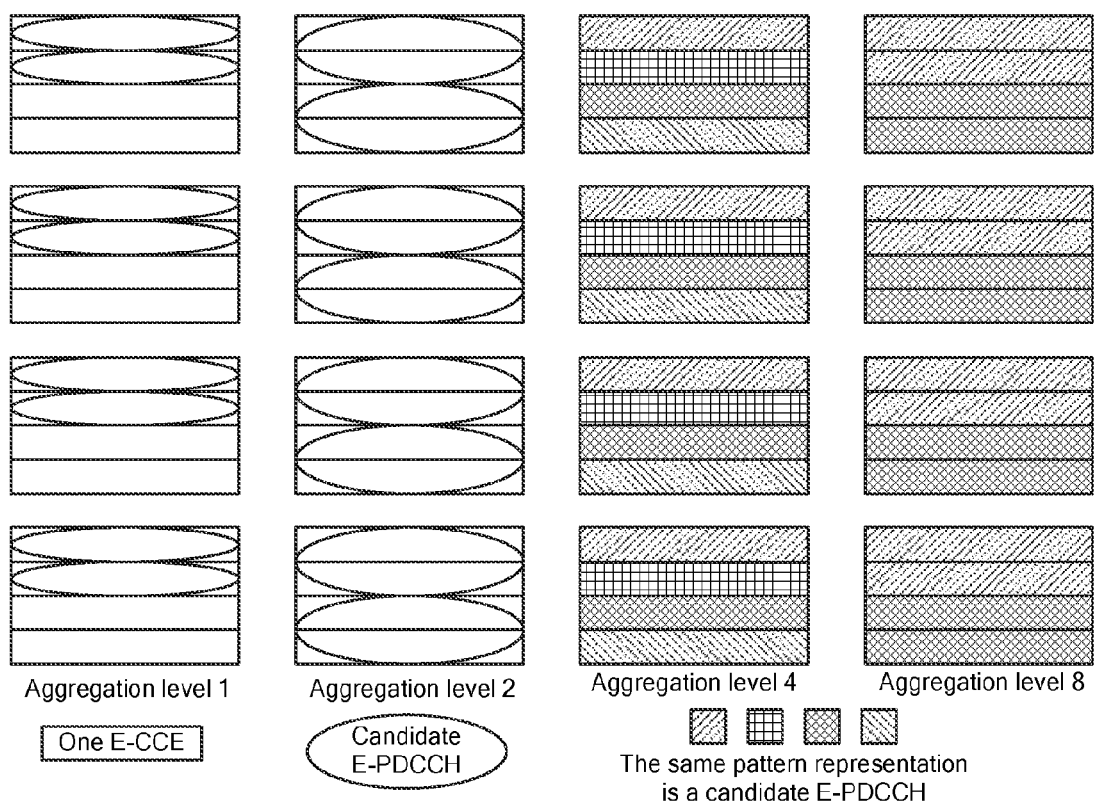
FIG. 6 is a schematic diagram of a second E-PDCCH search space configuration according to an embodiment of the invention.

In view of the complexity of blind detection by the user equipment on the E-PDCCHs, an E-PDCCH is preferably configured as four E-CCEs as illustrated in FIG. 6.

For the Aggregation Level 1:

The network-side apparatus 10 selects the E-PDCCHs occupying the plurality of time-frequency resources consecutive in frequency domain from the set of candidate E-PDCCHs as the candidate E-PDCCHs for carrying the DCI, where the number of candidate E-PDCCHs in the set of candidate E-PDCCHs is 8; and The user equipment 20 performs blind detection only on the E-PDCCHs occupying the plurality of time-frequency resources consecutive in frequency domain, where the number of candidate E-PDCCHs on which the user equipment performs blind detection is 8.

For the Aggregation Level 2:

The network-side apparatus 10 selects the E-PDCCHs occupying the plurality of time-frequency resources consecutive in frequency domain from the set of candidate E-PDCCHs as the candidate E-PDCCHs for carrying the DCI, where the number of candidate E-PDCCHs in the set of candidate E-PDCCHs is 8; and The user equipment 20 performs blind detection only on the E-PDCCHs occupying the plurality of time-frequency resources consecutive in frequency domain, where the number of candidate E-PDCCHs on which the user equipment performs blind detection is 8.

For the Aggregation Level 3:

The network-side apparatus 10 selects the E-PDCCHs occupying the plurality of time-frequency resources inconsecutive in frequency domain from the set of candidate E-PDCCHs as the candidate E-PDCCHs for carrying the DCI, where the number of candidate E-PDCCHs in the set of candidate E-PDCCHs is 4; and The user equipment 20 performs blind detection only on the E-PDCCHs occupying the plurality of time-frequency resources inconsecutive in frequency domain, where the number of candidate E-PDCCHs on which the user equipment performs blind detection is 4.

For the Aggregation Level 4:

The network-side apparatus 10 selects the E-PDCCHs occupying the plurality of time-frequency resources inconsecutive in frequency domain from the set of candidate E-PDCCHs as the candidate E-PDCCHs for carrying the DCI, where the number of candidate E-PDCCHs in the set of candidate E-PDCCHs is 2; and The user equipment 20 performs blind detection only on the E-PDCCHs occupying the plurality of time-frequency resources inconsecutive in frequency domain, where the number of candidate E-PDCCHs on which the user equipment performs blind detection is 2.

In a second scenario, if the aggregation level of the DCI to be transmitted is 1, then the network-side apparatus 10 can select the E-PDCCHs occupying the plurality of time-frequency resources consecutive in frequency domain from the set of candidate E-PDCCHs as the candidate E-PDCCHs for carrying the DCI;

If the aggregation level of the DCI to be transmitted is 4 or 8, then the network-side apparatus 10 can select the E-PDCCHs occupying the plurality of time-frequency resources inconsecutive in frequency domain from the set of candidate E-PDCCHs as the candidate E-PDCCHs for carrying the DCI; and If the aggregation level of the DCI to be transmitted is 2, then the network-side apparatus 10 can select the E-PDCCHs occupying the plurality of time-frequency resources consecutive in frequency domain and/or the E-PDCCHs occupying the plurality of time-frequency resources inconsecutive in frequency domain from the set of candidate E-PDCCHs as the candidate E-PDCCHs for carrying the DCI.

Correspondingly the user equipment 20 needs to perform blind detection for all the aggregation levels because it has no knowledge of the aggregation level of the DCI to be transmitted.

For the aggregation level 1, the user equipment 20 performs blind detection on the candidate E-PDCCHs occupying a plurality of time-frequency resources consecutive in frequency domain;

For the aggregation level 4 or 8, the user equipment 20 performs blind detection on the candidate E-PDCCHs occupying a plurality of time-frequency resources inconsecutive in frequency domain; and For the aggregation level 2, the user equipment 20 performs blind detection on the E-PDCCHs occupying the plurality of time-frequency resources consecutive in frequency domain and/or the E-PDCCHs occupying the plurality of time-frequency resources inconsecutive in frequency domain.

In an implementation, the user equipment has at least two candidate E-PDCCHs at each aggregation level and receives concurrently a DL grant for scheduling a PDSCH and a UL grant for scheduling a PUSCH.

Figure 7:
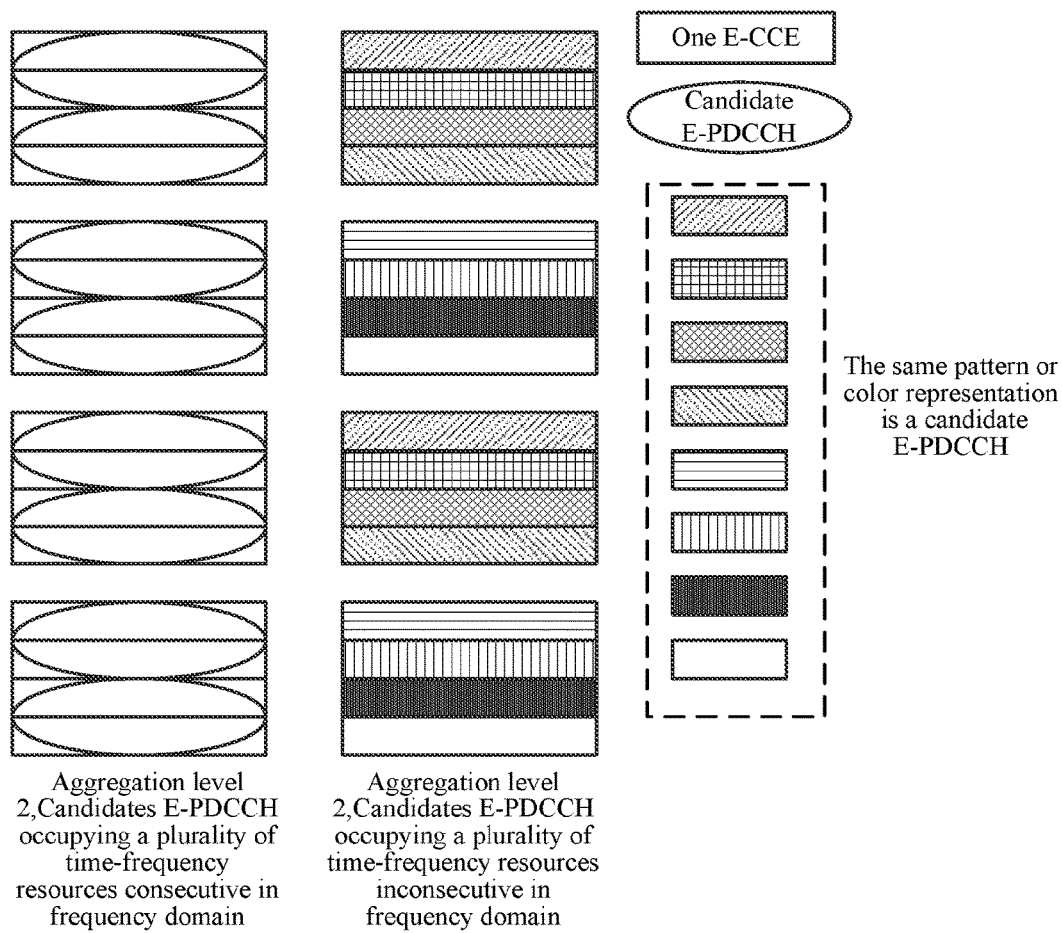
FIG. 7 is a schematic diagram of an E-PDCCH search space configuration at the aggregation level 2 according to an embodiment of the invention.

Taking FIG. 7 as an example, if the aggregation level of the DCI to be transmitted is 2, and the candidate E-PDCCHs selected at the network side from the set of candidate E-PDCCHs include the E-PDCCHs occupying the plurality of time-frequency resources inconsecutive in frequency domain, then there is one time-frequency resource at each aggregation level, and the plurality of inconsecutive time-frequency resources occupy two E-PDCCH clusters.

Correspondingly if the aggregation level of the DCI to be transmitted is 2, and the user equipment performs blind detection on the candidate E-PDCCHs occupying a plurality of time-frequency resources inconsecutive in frequency domain, then there is one time-frequency resource at each aggregation level, and the plurality of inconsecutive time-frequency resources occupy two E-PDCCH clusters.

If the E-PDCCHs occupying the plurality of time-frequency resources inconsecutive in frequency domain are selected and the plurality of inconsecutive time-frequency resources occupy a plurality of E-PDCCH clusters, then a gain of frequency diversity can be achieved. In view of the complexity of blind detection by the user equipment, the number of occupied E-PDCCH clusters can be lowered.

Figure 8:
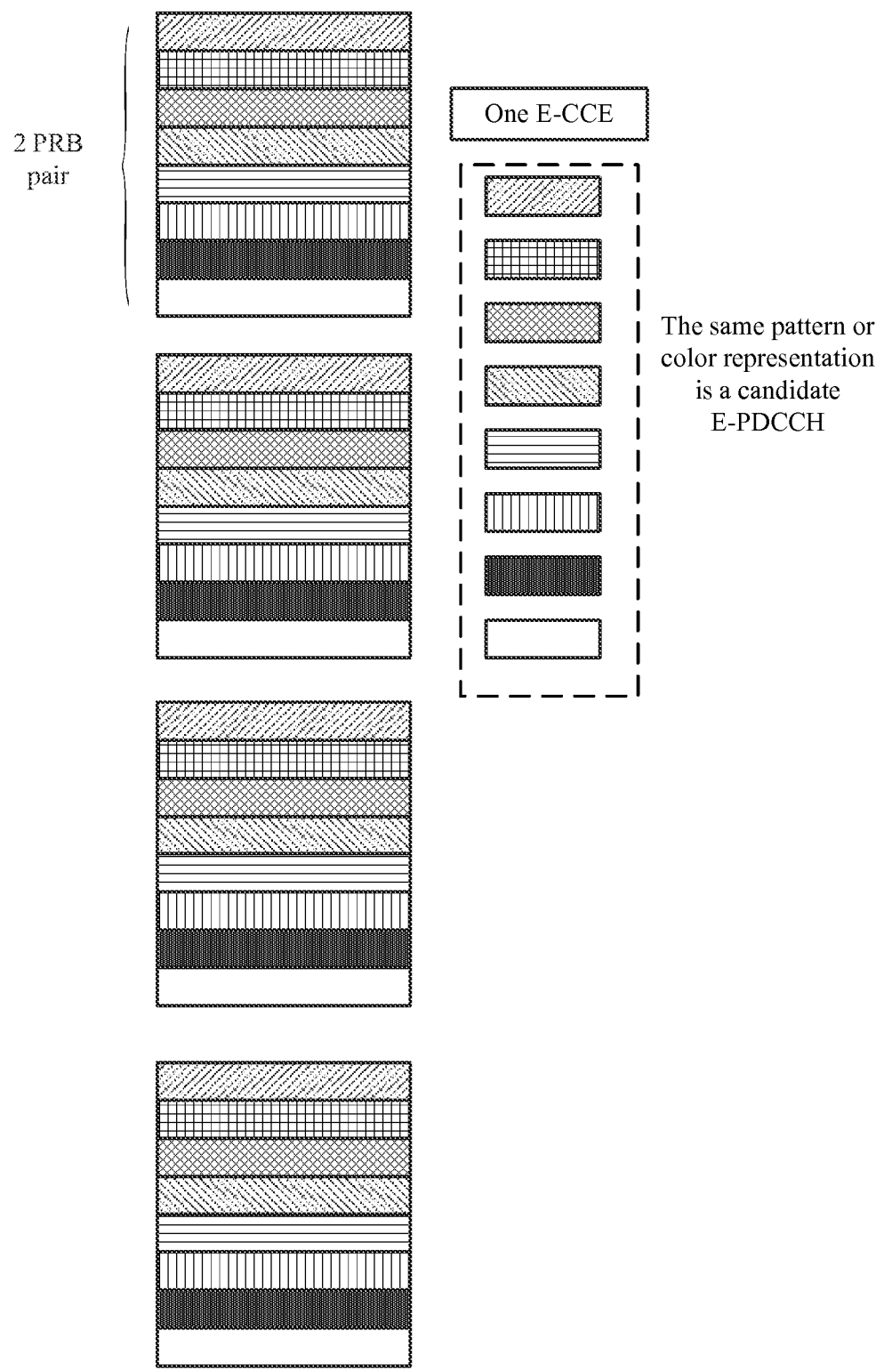
FIG. 8 is a schematic diagram of an inconsecutive E-PDCCH search space configuration at the aggregation level 2 according to an embodiment of the invention.

Taking FIG. 8 as an example, if the aggregation level of the DCI to be transmitted is 2, and the candidate E-PDCCHs selected at the network side from the set of candidate E-PDCCHs include the E-PDCCHs occupying the plurality of time-frequency resources inconsecutive in frequency domain, then there are a plurality of time-frequency resources at each aggregation level, and the plurality of inconsecutive time-frequency resources occupy four E-PDCCH clusters.

Correspondingly if the aggregation level of the DCI to be transmitted is 2, and the user equipment performs blind detection on the candidate E-PDCCHs occupying a plurality of time-frequency resources inconsecutive in frequency domain, then there are a plurality of time-frequency resources at each aggregation level, and the plurality of inconsecutive time-frequency resources occupy four E-PDCCH clusters.

In an implementation, if an E-CCE is composed of two E-REGs defined as illustrated in FIG. 4, then its inconsecutive search space at the aggregation level 2 can also be defined as illustrated in FIG. 8, where four E-REGs in two E-CCEs are distributed into different E-PDCCH clusters to thereby achieve a higher gain of frequency diversity. Particularly FIG. 8 illustrates an E-PDCCH cluster including two PRBs by way of an example.

In an implementation, a DMRS port for the network-side apparatus 10 and the user equipment 20 to demodulate the E-PDCCHs can be known as follows:

For the Network-Side Apparatus 10:

If the selected candidate E-PDCCHs are the E-PDCCH occupying a plurality of time-frequency resources consecutive in frequency domain, then the network-side apparatus 10 determines the DMRS port for demodulating the E-PDCCHs according to a higher-layer configuration; and If the selected candidate E-PDCCHs are the E-PDCCH occupying a plurality of time-frequency resources inconsecutive in frequency domain, then the network-side apparatus 10 determines the DMRS port for demodulating the E-PDCCHs according to a higher-layer configuration or an agreement with the network side or a system broadcast message.

For the User Equipment 20:

If the candidate E-PDCCHs for blind detection are the E-PDCCH occupying a plurality of time-frequency resources consecutive in frequency domain, then the user equipment 20 determines the DMRS port for demodulating the E-PDCCHs according to a higher-layer configuration; and If the candidate E-PDCCHs for blind detection are the E-PDCCH occupying a plurality of time-frequency resources inconsecutive in frequency domain, then the equipment 20 determines the DMRS port for demodulating the E-PDCCHs according to a higher-layer configuration or an agreement with the network side or a system broadcast message.

As illustrated in FIG. 9, the network-side apparatus in the system for transmitting information according to the embodiment of the invention includes a selection module 900 and a transmission module 910.

The selection module 900 is configured to select candidate E-PDCCHs for carrying DCI from a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain; and The transmission module 910 is configured to transmit the DCI over the selected candidate E-PDCCHs.

Preferably the selection module 900 is configured to select the candidate E-PDCCHs for carrying the DCI from the set of candidate E-PDCCHs according to an aggregation level of the DCI to be transmitted.

Preferably the time-frequency resources occupied at the aggregation level are configured fixedly or configured flexibly.

Preferably if the time-frequency resources occupied at the aggregation level are configured flexibly, then the selection module 900 determines the size of time-frequency resources occupied at the aggregation level according to a resource configuration or a carrier configuration or higher-layer instruction information.

If the aggregation level of the DCI to be transmitted is 1 or 2, then the selection module 900 selects the E-PDCCHs occupying the plurality of time-frequency resources consecutive in frequency domain from the set of candidate E-PDCCHs as the the candidate E-PDCCHs for carrying the DCI; and If the aggregation level of the DCI to be transmitted is 4 or 8, then the selection module 900 selects the E-PDCCHs occupying the plurality of time-frequency resources inconsecutive in frequency domain from the set of candidate E-PDCCHs as the candidate E-PDCCHs for carrying the DCI.

Preferably if the aggregation level is 1, then the number of candidate E-PDCCHs in the set of candidate E-PDCCHs is 8;

If the aggregation level is 2, then the number of candidate E-PDCCHs in the set of candidate E-PDCCHs is 8;

If the aggregation level is 4, then the number of candidate E-PDCCHs in the set of candidate E-PDCCHs is 4; and If the aggregation level is 8, then the number of candidate E-PDCCHs in the set of candidate E-PDCCHs is 2.

Preferably if the aggregation level of the DCI to be transmitted is 1, then the selection module 900 selects the E-PDCCHs occupying the plurality of time-frequency resources consecutive in frequency domain from the set of candidate E-PDCCHs as the candidate E-PDCCHs for carrying the DCI;

If the aggregation level of the DCI to be transmitted is 4 or 8, then the selection module 900 selects the E-PDCCHs occupying the plurality of time-frequency resources inconsecutive in frequency domain from the set of candidate E-PDCCHs as the candidate E-PDCCHs for carrying the DCI; and If the aggregation level of the DCI to be transmitted is 2, then the network-side selection module 900 selects the E-PDCCHs occupying the plurality of time-frequency resources consecutive in frequency domain and/or the E-PDCCHs occupying the plurality of time-frequency resources inconsecutive in frequency domain from the set of candidate E-PDCCHs as the candidate E-PDCCHs for carrying the DCI.

Preferably if the aggregation level of the DCI to be transmitted is 2, and the candidate E-PDCCHs selected by the selection module 900 from the set of candidate E-PDCCHs include the E-PDCCHs occupying the plurality of time-frequency resources inconsecutive in frequency domain, then there are one or more time-frequency resources at each aggregation level.

Preferably if the aggregation level of the DCI to be transmitted is 2, and the candidate E-PDCCHs selected by the selection module 900 from the set of candidate E-PDCCHs include the E-PDCCHs occupying the plurality of time-frequency resources inconsecutive in frequency domain, then the plurality of inconsecutive time-frequency resources occupy two or four E-PDCCH clusters.

Particularly the network-side apparatus according to the embodiment of the invention can be a base station (e.g., a macro base station, a home base station, etc.) or can be a Relay Node (RN) apparatus or can be another network-side apparatus.

As illustrated in FIG. 10, the user equipment in the system for transmitting information in the embodiment of the invention includes a determination module 1000 and a blind detection module 1010.

The determination module 1000 is configured to determine a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain; and The blind detection module 1010 is configured to perform blind detection on all the candidate E-PDCCHs in the set of candidate E-PDCCHs to receive DCI.

Preferably the blind detection module 1010 performs blind detection on all the candidate E-PDCCHs in the set of candidate E-PDCCHs for each of different aggregation levels.

Preferably the time-frequency resources occupied at the aggregation level are configured fixedly or configured flexibly.

Preferably if the time-frequency resources occupied at the aggregation level are configured flexibly, then the blind detection module 1010 determines the size of time-frequency resources occupied at the aggregation level according to a resource configuration or a carrier configuration or higher-layer instruction information.

Preferably the blind detection module 1010 performs blind detection on the E-PDCCHs occupying the plurality of time-frequency resources consecutive in frequency domain at the aggregation level 1 or 2; and The blind detection module 1010 performs blind detection on the E-PDCCHs occupying the plurality of time-frequency resources inconsecutive in frequency domain at the aggregation level 4 or 8.

Preferably if the aggregation level is 1, then the number of candidate E-PDCCHs for blind detection by the blind detection module is 8;

If the aggregation level is 2, then the number of candidate E-PDCCHs for blind detection by the blind detection module is 8;

If the aggregation level is 4, then the number of candidate E-PDCCHs for blind detection by the blind detection module is 4; and If the aggregation level is 8, then the number of candidate E-PDCCHs for blind detection by the blind detection module is 2.

Preferably the blind detection module 1010 performs blind detection on the E-PDCCHs occupying the plurality of time-frequency resources consecutive in frequency domain at the aggregation level 1;

The blind detection module 1010 performs blind detection on the E-PDCCHs occupying the plurality of time-frequency resources inconsecutive in frequency domain at the aggregation level 4 or 8; and The blind detection module 1010 performs blind detection on the E-PDCCHs occupying the plurality of time-frequency resources consecutive in frequency domain and/or the E-PDCCHs occupying the plurality of time-frequency resources inconsecutive in frequency domain at the aggregation level 2.

Preferably if the aggregation level of the DCI to be transmitted is 2, and the blind detection module 1010 performs blind detection on the E-PDCCHs occupying the plurality of time-frequency resources inconsecutive in frequency domain, then there are one or more time-frequency resources at each aggregation level.

Preferably if the aggregation level of the DCI to be transmitted is 2, and the blind detection module 1010 performs blind detection on the E-PDCCHs occupying the plurality of time-frequency resources inconsecutive in frequency domain, then the plurality of inconsecutive time-frequency resources occupy two or four E-PDCCH clusters.

Based upon the same inventive idea, an embodiment of the invention further provides a method of transmitting information at the network side, and since the method addresses the problem under a similar principle to the network-side apparatus in the system for transmitting information, reference can be made to the implementation of the system for an implementation of the method, so a repeated description thereof will be omitted.

As illustrated in FIG. 11, a method of transmitting information at the network side according to an embodiment of the invention includes the following steps:

Step 1101: The network side selects candidate E-PDCCHs for carrying DCI from a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain; and Step 1102: The network side transmits the DCI over the selected candidate E-PDCCHs.

Preferably in the step 1101, the network side selects the candidate E-PDCCHs for carrying the DCI from the set of candidate E-PDCCHs according to an aggregation level of the DCI to be transmitted.

Preferably the time-frequency resources occupied at the aggregation level are configured fixedly or configured flexibly.

Preferably before the step 1102, if the time-frequency resources occupied at the aggregation level are configured flexibly, then the network side determines the size of time-frequency resources occupied at the aggregation level according to a resource configuration or a carrier configuration or higher-layer instruction information.

Preferably in the step 1101, if the aggregation level of the DCI to be transmitted is 1 or 2, then the network side selects the E-PDCCHs occupying the plurality of time-frequency resources consecutive in frequency domain from the set of candidate E-PDCCHs as the candidate E-PDCCHs for carrying the DCI; and If the aggregation level of the DCI to be transmitted is 4 or 8, then the network side selects the E-PDCCHs occupying the plurality of time-frequency resources inconsecutive in frequency domain from the set of candidate E-PDCCHs as the candidate E-PDCCHs for carrying the DCI.

Preferably if the aggregation level is 1, then the number of candidate E-PDCCHs in the set of candidate E-PDCCHs is 8;

If the aggregation level is 2, then the number of candidate E-PDCCHs in the set of candidate E-PDCCHs is 8;

If the aggregation level is 4, then the number of candidate E-PDCCHs set of candidate E-PDCCHs is 4; and If the aggregation level is 8, then the number of candidate E-PDCCHs in the set of candidate E-PDCCHs is 2.

Preferably in the step 1101, if the aggregation level of the DCI to be transmitted is 1, then the network side selects the E-PDCCHs occupying the plurality of time-frequency resources consecutive in frequency domain from the set of candidate E-PDCCHs as the candidate E-PDCCHs for carrying the DCI;

If the aggregation level of the DCI to be transmitted is 4 or 8, then the network side selects the E-PDCCHs occupying the plurality of time-frequency resources inconsecutive in frequency domain from the set of candidate E-PDCCHs as the candidate E-PDCCHs for carrying the DCI; and If the aggregation level of the DCI to be transmitted is 2, then the network-side network side selects the E-PDCCHs occupying the plurality of time-frequency resources consecutive in frequency domain and/or the E-PDCCHs occupying the plurality of time-frequency resources inconsecutive in frequency domain from the set of candidate E-PDCCHs as the candidate E-PDCCHs for carrying the DCI.

Preferably if the aggregation level of the DCI to be transmitted is 2, and the candidate E-PDCCHs selected by the network side from the set of candidate E-PDCCHs include the E-PDCCHs occupying the plurality of time-frequency resources inconsecutive in frequency domain, then there are one or more time-frequency resources at each aggregation level.

Preferably if the aggregation level of the DCI to be transmitted is 2, and the candidate E-PDCCHs selected by the network side from the set of candidate E-PDCCHs include the E-PDCCHs occupying the plurality of time-frequency resources inconsecutive in frequency domain, then the plurality of inconsecutive time-frequency resources occupy two or four E-PDCCH clusters.

Based upon the same inventive idea, an embodiment of the invention further provides a method of transmitting information at a user equipment, and since the method addresses the problem under a similar principle to the user equipment in the system for transmitting information, reference can be made to the implementation of the system for an implementation of the method, so a repeated description thereof will be omitted.

As illustrated in FIG. 12, a method of transmitting information at a user equipment according to an embodiment of the invention includes the following steps:

Step 1201. A user equipment determines a set of candidate E-PDCCHs, where the set of candidate E-PDCCHs includes E-PDCCHs occupying a plurality of time-frequency resources consecutive in frequency domain and E-PDCCHs occupying a plurality of time-frequency resources inconsecutive in frequency domain; and Step 1202. The user equipment performs blinds detection on all the candidate E-PDCCHs in the set of candidate E-PDCCHs to receive DCI.

Preferably in the step 1201, the user equipment performs blind detection on all the candidate E-PDCCHs in the set of candidate E-PDCCHs for each of different aggregation levels.

Preferably the time-frequency resources occupied at the aggregation level are configured fixedly or configured flexibly.

Preferably before the step 1202, if the time-frequency resources occupied at the aggregation level are configured flexibly, then the user equipment determines the size of time-frequency resources occupied at the aggregation level according to a resource configuration or a carrier configuration or higher-layer instruction information.

Preferably in the step 1202, the user equipment performs blind detection on the E-PDCCHs occupying the plurality of time-frequency resources consecutive in frequency domain at the aggregation level 1 or 2; and The user equipment performs blind detection on the E-PDCCHs occupying the plurality of time-frequency resources inconsecutive in frequency domain at the aggregation level 4 or 8.

Preferably if the aggregation level is 1, then the number of candidate E-PDCCHs for blind detection by the blind detection module is 8;

If the aggregation level is 2, then the number of candidate E-PDCCHs for blind detection by the blind detection module is 8;

If the aggregation level is 4, then the number of candidate E-PDCCHs for blind detection by the blind detection module is 4; and If the aggregation level is 8, then the number of candidate E-PDCCHs for blind detection by the blind detection module is 2.

Preferably in the step 1202, the user equipment performs blind detection on the E-PDCCHs occupying the plurality of time-frequency resources consecutive in frequency domain at the aggregation level 1;

The user equipment performs blind detection on the E-PDCCHs occupying the plurality of time-frequency resources inconsecutive in frequency domain at the aggregation level 4 or 8; and The user equipment performs blind detection on the E-PDCCHs occupying the plurality of time-frequency resources consecutive in frequency domain and/or the E-PD- CCHs occupying the plurality of time-frequency resources inconsecutive in frequency domain at the aggregation level 2.

Preferably if the aggregation level of the DCI to be transmitted is 2, and the user equipment performs blind detection on the E-PDCCHs occupying the plurality of time-frequency resources inconsecutive in frequency domain, then there are one or more time-frequency resources at each aggregation level.

Preferably if the aggregation level of the DCI to be transmitted is 2, and the user equipment performs blind detection on the E-PDCCHs occupying the plurality of time-frequency resources inconsecutive in frequency domain, then the plurality of inconsecutive time-frequency resources occupy two or four E-PDCCH clusters.

Particularly FIG. 11 and FIG. 12 can be combined into a flow of a method of transmitting information, that is, firstly the steps 1101 and 1102 and then the step 1202 are performed, where the step 1201 may not necessarily be performed in a specific chronological order relative to the steps 1101 and the step 1102 so long as it is performed before the step 1202.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of transmitting information, the method comprising:
    selecting, by a network side, candidate Enhanced-Physical Downlink Control Channels (E-PDCCHs) for carrying Downlink Control Information (DCI) from a set of candidate E-PDCCHs, wherein the set of candidate E-PDCCHs includes E-PDCCHs occupying a plurality of time-frequency resources consecutive in frequency domain and E-PDCCHs occupying a plurality of time-frequency resources inconsecutive in frequency domain;
    wherein selecting, by the network side, the candidate E-PDCCHs for carrying the DCI comprises:
    selecting, by the network side, the candidate E-PDCCHs for carrying the DCI from the set of candidate E-PDCCHs according to at least one aggregation level at which the DCI is to be transmitted, wherein each aggregation level corresponds to a respective number of time-frequency resources occupied by a respective candidate E-PDCCH, and wherein each time-frequency resource is an Enhanced-Control Channel Element (E-CCE) comprising Resource Elements (REs);
    wherein the size of time-frequency resources occupied at each aggregation level are configured flexibly;
    wherein before the network side transmits the DCI, the method further comprises:
    determining, by the network side, the size of time-frequency resources occupied at each aggregation level according to a resource configuration or a carrier configuration or higher-layer instruction information;
    transmitting, by the network side, the DCI over the selected candidate E-PDCCHs.

2. The method according to claim 1, wherein the plurality of time-frequency resources consecutive in frequency domain occupy at least one E-PDCCH cluster; and
    the plurality of time-frequency resources inconsecutive in frequency domain occupy a plurality of E-PDCCH clusters.

3. The method according to claim 1, wherein selecting, by the network side, the candidate E-PDCCHs for carrying the DCI comprises:
    selecting, by the network side, the E-PDCCHs occupying the plurality of time-frequency resources consecutive in frequency domain from the set of candidate E-PDCCHs as the candidate E-PDCCHs for carrying the DCI if the aggregation level of the DCI to be transmitted is 1 or 2; and
    selecting, by the network side, the E-PDCCHs occupying the plurality of time-frequency resources inconsecutive in frequency domain from the set of candidate E-PD- CCHs as the candidate E-PDCCHs for carrying the DCI if the aggregation level of the DCI to be transmitted is 4 or 8.

4. The method according to claim 1, wherein selecting, by the network side, the candidate E-PDCCHs for carrying the DCI comprises:
   selecting, by the network side, the E-PDCCHs occupying the plurality of time-frequency resources consecutive in frequency domain from the set of candidate E-PDCCHs as the candidate E-PDCCHs for carrying the DCI if the aggregation level of the DCI to be transmitted is 1;
   selecting, by the network side, the E-PDCCHs occupying the plurality of time-frequency resources inconsecutive in frequency domain from the set of candidate E-PDCCHs as the candidate E-PDCCHs for carrying the DCI if the aggregation level of the DCI to be transmitted is 4 or 8; and
   selecting, by the network side, the E-PDCCHs occupying the plurality of time-frequency resources consecutive in frequency domain and/or the E-PDCCHs occupying the plurality of time-frequency resources inconsecutive in frequency domain from the set of candidate E-PDCCHs as the candidate E-PDCCHs for carrying the DCI if the aggregation level of the DCI to be transmitted is 2.

5. A method of transmitting information, the method comprising:
   determining, by a user equipment, a set of candidate Enhanced-Physical Downlink Control Channels (E-PDCCHs) for carrying Downlink Control Information (DCI), wherein the set of candidate E-PDCCHs includes E-PDCCHs occupying a plurality of time-frequency resources consecutive in frequency domain and E-PDCCHs occupying a plurality of time-frequency resources inconsecutive in frequency domain;
   wherein the size of time-frequency resources occupied at each of different aggregation levels are configured flexibly, wherein each aggregation level corresponds to a respective number of time-frequency resources occupied by a respective candidate E-PDCCH, and wherein each time-frequency resource is an Enhanced-Control Channel Element (E-CCE) comprising Resource Elements (REs);
   wherein before the user equipment performs blind detection, the method further comprises:
   determining, by the user equipment, the size of time-frequency resources occupied at each aggregation level according to a resource configuration or a carrier configuration or higher-layer instruction information; and
   performing, by the user equipment, blind detection on all the candidate E-PDCCHs in the set of candidate E-PDCCHs for each of the different aggregation levels;
   wherein performing, by the user equipment, blind detection comprises:
   performing, by the user equipment, blind detection on all the candidate E-PDCCHs in the set of candidate E-PDCCHs to receive DCI.

6. The method according to claim 5, wherein the plurality of time-frequency resources consecutive in frequency domain occupy at least one E-PDCCH cluster; and
   the plurality of time-frequency resources inconsecutive in frequency domain occupy a plurality of E-PDCCH clusters.

7. The method according to claim 5, wherein performing, by the user equipment, blind detection comprises:
   performing, by the user equipment, blind detection on the E-PDCCHs occupying the plurality of time-frequency resources consecutive in frequency domain at the aggregation level 1 or 2; and
   performing, by the user equipment, blind detection on the E-PDCCHs occupying the plurality of time-frequency resources inconsecutive in frequency domain at the aggregation level 4 or 8.

8. The method according to claim 5, wherein performing, by the user equipment, blind detection comprises:
   performing, by the user equipment, blind detection on the E-PDCCHs occupying the plurality of time-frequency resources consecutive in frequency domain at the aggregation level 1;
   performing, by the user equipment, blind detection on the E-PDCCHs occupying the plurality of time-frequency resources inconsecutive in frequency domain at the aggregation level 4 or 8; and
   performing, by the user equipment, blind detection on the E-PDCCHs occupying the plurality of time-frequency resources consecutive in frequency domain and/or the E-PDCCHs occupying the plurality of time-frequency resources inconsecutive in frequency domain at the aggregation level 2.

9. A user equipment for transmitting information, the user equipment comprising:
   a determination module configured to determine a set of candidate Enhanced-Physical Downlink Control Channels (E-PDCCHs) for carrying Downlink Control Information (DCI), wherein the set of candidate E-PDCCHs includes E-PDCCHs occupying a plurality of time-frequency resources consecutive in frequency domain and E-PDCCHs occupying a plurality of time-frequency resources inconsecutive in frequency domain;
   wherein the size of time-frequency resources occupied at each of different aggregation levels are configured flexibly, wherein each aggregation level corresponds to a respective number of time-frequency resources occupied by a respective candidate E-PDCCH, and wherein each time-frequency resource is an Enhanced-Control Channel Element (E-CCE) comprising Resource Elements (REs);
   a blind detection module configured:
   to determine the size of time-frequency resources occupied at each aggregation level according to a resource configuration or a carrier configuration or higher-layer instruction information;
   the blind detection module is further configured:
   to perform blind detection on all the candidate E-PDCCHs in the set of candidate E-PDCCHs for each of the different aggregation levels; and
   to perform blind detection on all the candidate E-PDCCHs in the set of candidate E-PDCCHs to receive DCI.

10. The user equipment according to claim 9, wherein the blind detection module is further configured:
    to perform blind detection on the E-PDCCHs occupying the plurality of time-frequency resources consecutive in frequency domain at the aggregation level 1 or 2; and
    to perform blind detection on the E-PDCCHs occupying the plurality of time-frequency resources inconsecutive in frequency domain at the aggregation level 4 or 8.

11. The user equipment according to claim 9, wherein the blind detection module is further configured:

to perform blind detection on the E-PDCCHs occupying the plurality of time-frequency resources consecutive in frequency domain at the aggregation level 1;

to perform blind detection on the E-PDCCHs occupying the plurality of time-frequency resources inconsecutive in frequency domain at the aggregation level 4 or 8; and to perform blind detection on the E-PDCCHs occupying the plurality of time-frequency resources consecutive in frequency domain and/or the E-PDCCHs occupying the plurality of time-frequency resources inconsecutive in frequency domain at the aggregation level 2.

\* \* \* \* \*